United States Patent
Kim et al.

(10) Patent No.: US 11,943,834 B2
(45) Date of Patent: Mar. 26, 2024

(54) ELECTRONIC DEVICE AND CONTROL METHOD THEREOF

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Minsoo Kim, Suwon-si (KR); Sungjin Shin, Suwon-si (KR); Kyeonghun Lee, Suwon-si (KR); Keuncheol Lee, Suwon-si (KR); Youngki Lee, Seoul (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 367 days.

(21) Appl. No.: 17/428,486

(22) PCT Filed: Nov. 10, 2020

(86) PCT No.: PCT/KR2020/015673
§ 371 (c)(1),
(2) Date: Aug. 4, 2021

(87) PCT Pub. No.: WO2021/201365
PCT Pub. Date: Oct. 7, 2021

(65) Prior Publication Data
US 2022/0322062 A1    Oct. 6, 2022

(30) Foreign Application Priority Data
Mar. 31, 2020  (KR) .................. 10-2020-0039348

(51) Int. Cl.
H04W 4/00      (2018.01)
H04W 8/00      (2009.01)
(Continued)

(52) U.S. Cl.
CPC ........... *H04W 8/005* (2013.01); *H04W 48/14* (2013.01); *H04W 88/08* (2013.01)

(58) Field of Classification Search
CPC ..... H04W 8/005; H04W 48/14; H04W 88/08; H04W 8/00
(Continued)

(56) References Cited

U.S. PATENT DOCUMENTS 7,885,318 B2 * 2/2011 Saily .................... H04B 17/345
                                              370/320
8,548,497 B2   10/2013 Lymberopoulos et al.
(Continued)

FOREIGN PATENT DOCUMENTS

CN    104898089    9/2015
CN    105309018    2/2016
(Continued)

OTHER PUBLICATIONS

International Search Report for PCT/KR2020/015673 dated Feb. 15, 2021, 5 pages w/ English Translation.
(Continued)

*Primary Examiner* — Marceau Milord
(74) *Attorney, Agent, or Firm* — Nixon & Vanderhye P.C.

(57) ABSTRACT

An electronic apparatus is provided. The electronic device includes: a communication interface comprising communication circuitry; a memory storing information for correcting a signal received from each of a plurality of other electronic devices; and a processor connected to the memory and the communication interface and configured to control the electronic device, wherein the processor is configured to: control the communication interface to perform communication with another electronic device operating as a software enabled access point, identify another electronic device that has transmitted a signal among the plurality of other elec-
(Continued)

tronic devices based on the signal based on the signal being received from another electronic device through the communication interface, and correct the received signal based on correction information corresponding to another electronic device among the information stored in the memory.

13 Claims, 9 Drawing Sheets

(51) Int. Cl.
    *H04W 48/14*     (2009.01)
    *H04W 88/08*     (2009.01)

(58) Field of Classification Search
    USPC ............................................. 370/329
    See application file for complete search history.

(56) References Cited

U.S. PATENT DOCUMENTS

| | | |
|---|---|---|
| 8,792,371 B2 | 7/2014 | Woo |
| 9,154,919 B2 | 10/2015 | Yun et al. |
| 9,204,259 B2 | 12/2015 | Ogale et al. |
| 9,271,243 B2 | 2/2016 | Yoon et al. |
| 9,301,097 B2 | 3/2016 | Marti et al. |
| 9,392,562 B2 | 7/2016 | Patel et al. |
| 9,635,516 B1 | 4/2017 | Gu et al. |
| 9,730,029 B2 | 8/2017 | Choudhury et al. |
| 10,028,242 B2 | 7/2018 | Yang et al. |
| 10,602,469 B2 | 3/2020 | Yang et al. |
| 10,939,367 B1* | 3/2021 | Koshy ................... H04W 4/023 |
| 10,979,992 B2 | 4/2021 | Yang et al. |
| 11,540,129 B2* | 12/2022 | Hamzeh ............... H04W 12/033 |
| 11,706,716 B1* | 7/2023 | Wu .......................... H04L 1/201 |
| | | 370/311 |
| 2003/0067963 A1* | 4/2003 | Miller .................. H04L 25/4902 |
| | | 375/130 |
| 2008/0181155 A1* | 7/2008 | Sherman ........... H04W 52/0229 |
| | | 370/311 |
| 2010/0109864 A1 | 5/2010 | Haartsen et al. |
| 2011/0002371 A1* | 1/2011 | Forenza ............... H04B 17/309 |
| | | 375/227 |
| 2013/0185578 A1* | 7/2013 | Tan ....................... G06F 1/3234 |
| | | 713/323 |
| 2013/0279349 A1 | 10/2013 | Pandey et al. |
| 2013/0281021 A1* | 10/2013 | Palin ..................... H04W 8/005 |
| | | 455/41.2 |
| 2014/0092771 A1* | 4/2014 | Siomina ................ H04W 24/08 |
| | | 370/252 |
| 2015/0049681 A1* | 2/2015 | Huang .................. H04W 48/20 |
| | | 370/329 |
| 2015/0055496 A1 | 2/2015 | Zhao et al. |
| 2016/0234802 A1 | 8/2016 | Yang et al. |
| 2017/0093807 A1* | 3/2017 | Gross .................. H04W 88/085 |
| 2017/0160776 A1* | 6/2017 | Ahmed ................. G06F 1/3212 |
| 2017/0347338 A1* | 11/2017 | Chen ..................... H04W 72/30 |
| 2017/0359106 A1* | 12/2017 | John Wilson ........ H04B 7/0617 |
| 2018/0199265 A1* | 7/2018 | Liu ....................... H04W 48/16 |
| 2018/0295597 A1 | 10/2018 | Yang et al. |
| 2018/0359749 A1* | 12/2018 | Liu ....................... H04L 5/0091 |
| 2020/0022103 A1* | 1/2020 | Kim ....................... G01S 5/0263 |
| 2020/0267677 A1 | 8/2020 | Yang et al. |
| 2022/0256648 A1* | 8/2022 | Jung ..................... H04W 40/24 |
| 2022/0418042 A1* | 12/2022 | Seo ......................... H04W 4/80 |
| 2023/0156569 A1* | 5/2023 | Breaux, III ........... H04W 12/08 |
| | | 381/86 |

FOREIGN PATENT DOCUMENTS

| | | |
|---|---|---|
| KR | 10-2012-0046547 | 5/2012 |
| KR | 10-2012-0097524 | 9/2012 |
| KR | 10-2012-0134906 | 12/2012 |
| KR | 10-1396877 | 5/2014 |
| KR | 10-2015-0107056 | 9/2015 |
| KR | 10-1685785 | 12/2016 |
| KR | 10-1956085 | 3/2019 |
| KR | 10-2020-0017611 | 2/2020 |

OTHER PUBLICATIONS

Written Opinion of the ISA for PCT/KR2020/015673 dated Feb. 15, 2021, 8 pages w/ English Translation.

* cited by examiner

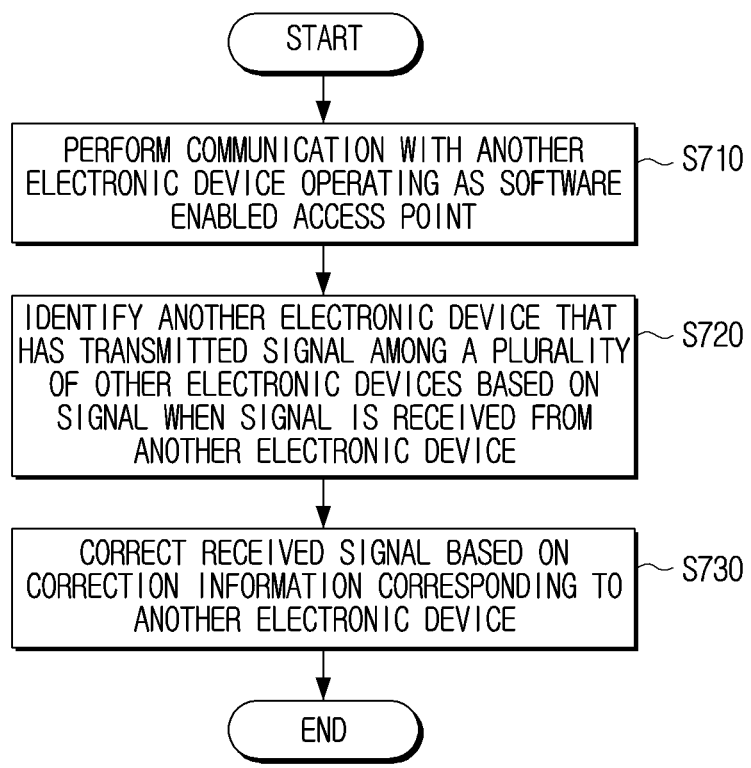

ELECTRONIC DEVICE AND CONTROL METHOD THEREOF

CROSS-REFERENCE TO RELATED APPLICATIONS

This application is a national stage application of International Application No. PCT/KR2020/015673 designating the U.S. and filed Nov. 10, 2020, in the Korean Intellectual Property Receiving Office and claiming priority to Korean Patent Application No. 10-2020-0039348, filed Mar. 31, 2020, in the Korean Intellectual Property Office, the disclosures of which are incorporated by reference herein in their entireties.

BACKGROUND

Field

The disclosure relates to an electronic device and a control method thereof, and for example, to an electronic device that processes a signal received from a peripheral electronic device, and a control method thereof.

Description of Related Art

In accordance with the rapid development of electronic devices, electronic devices having various data communication functions have been developed. For example, the electronic device may have a function of operating as a software enabled access point.

Here, the software enabled access point may be a function implemented in software to serve as an access point to operate like a wireless access point. For example, a hotspot function of a smartphone is a software enabled access point, and is a function of operating like a wireless access point.

Recently, home appliances have been released in a state in which they have a software enabled access point function. For example, as illustrated in FIG. 1, a television (TV), a refrigerator, and a speaker may each operate as a software enabled access point, and among them, a dual anchor device may identify a user based on signals transmitted and received to and from other home appliances.

However, unless a main purpose of the home appliances is to operate as the software enabled access point, there is a problem that a fine difference between signals occurs even though the home appliances operate in the same standard as the software enabled access point.

SUMMARY

Embodiments of the disclosure provide an electronic device capable of correcting a signal received from another electronic device operating as a software enabled access point, and a control method thereof.

According to an example embodiment of the disclosure, an electronic device includes: a communication interface including communication circuitry; a memory storing information for correcting a signal received from each of a plurality of other electronic devices; and a processor connected to the memory and the communication interface and configured to control the electronic device, wherein the processor is configured to: control the communication interface to perform communication with another electronic device operating as a software enabled access point; identify another electronic device that has transmitted a signal among a plurality of other electronic devices based on the signal based on the signal being received from another electronic device through the communication interface; and correct the received signal based on correction information corresponding to another electronic device among the information stored in the memory.

The processor may be configured to correct least one of a received signal strength indication (RSSI), channel state information (CSI), an amplitude, a phase, or a period of the received signal based on the correction information.

The memory may store information on a reference signal, and the processor may be configured to compare a first signal with the reference signal to obtain the correction information for correcting the signal received from another electronic device and store the obtained correction information in the memory, based on the first signal being received from another electronic device through connection of initial communication with another electronic device.

The processor may be configured to receive the reference signal from an access point and store the received reference signal in the memory, and the reference signal and the first signal may include the same original data.

The memory may store an artificial intelligence model trained to identify information on a user, and the processor may be configured to identify at least one of whether the user exists or a position of the user by inputting the corrected signal into the artificial intelligence model.

The processor may be configured to identify at least one of whether the user exists or the position of the user by inputting a plurality of overlapping sections in the corrected signal to the artificial intelligence model.

The processor may be configured to control another electronic device to not operate as the software enabled access point based on the position of the user being spaced apart from a position of another electronic device by a specified distance or more or based on a first point in time being reached.

The processor may be configured to control another electronic device to operate as the software enabled access point based on the user moving within the specified distance from another electronic device or a second point in time being reached while another electronic device does not operate as the software enabled access point.

The electronic device may operate as the software enabled access point, and be a device having at least one of operation capability or power efficiency improved as compared with another electronic device.

The processor may be configured to identify another electronic device of the plurality of other electronic devices based on a media access control address (Mac address) included in the received signal.

According to an example embodiment of the disclosure, a method of controlling an electronic device includes: performing communication with another electronic device operating as a software enabled access point; identifying another electronic device that has transmitted a signal among a plurality of other electronic devices based on the signal based on the signal being received from another electronic device; and correcting the received signal based on correction information corresponding to another electronic device.

In the correcting, at least one of an RSSI, CSI, an amplitude, a phase, or a period of the received signal may be corrected based on the correction information.

The method may further include: receiving a first signal from another electronic device through connection of initial communication with another electronic device; comparing the first signal with a reference signal to obtain the correction information for correcting the signal received from another electronic device; and storing the obtained correction information.

The method may further include: receiving the reference signal from an access point; and storing the received reference signal, wherein the reference signal and the first signal include the same original data.

The method may further include identifying at least one of whether a user exists or a position of the user by inputting the corrected signal to an artificial intelligence model trained to identify information on the user.

In the identifying of at least one of whether the user exists or the position of the user, at least one of whether the user exists or the position of the user may be identified by inputting a plurality of overlapping sections in the corrected signal to the artificial intelligence model.

The method may further include controlling another electronic device to not operate as the software enabled access point based on the position of the user being spaced apart from a position of another electronic device by a specified distance or more or a first point in time being reached.

The method may further include controlling another electronic device to operate as the software enabled access point based on the user moving within the specified distance from another electronic device or a second point in time being reached while another electronic device does not operate as the software enabled access point.

The electronic device may operate as the software enabled access point, and be a device having at least one of operation capability or power efficiency improved as compared with another electronic device.

In the identifying, another electronic device of the plurality of other electronic devices may be identified based on a Mac address included in the received signal.

According to various example embodiments of the disclosure, the electronic device may correct the signal received from another electronic device operating as the software enabled access point to remove a fine difference between signals from the plurality of other electronic devices.

In addition, the electronic device may improve accuracy of the identification of whether the user exists and the position of the user based on the signal received from at least one other electronic device operating as the software enabled access point.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a flowchart illustrating an example method of controlling an electronic device according to various embodiments.

DETAILED DESCRIPTION

Hereinafter, the disclosure will be described in greater detail with reference to the accompanying drawings.

General terms that are currently widely used were selected as terms used in the disclosure in consideration of functions in the disclosure, but may be changed depending on the intention of those skilled in the art or a judicial precedent, the emergence of a new technique, and the like. In addition, in some cases, terms arbitrarily selected. In this case, the meaning of such terms will be mentioned in detail in a corresponding description portion of the disclosure. Therefore, the terms used in the disclosure are to be defined based on the meaning of the terms and the contents throughout the disclosure rather than simple names of the terms.

In the disclosure, an expression "have", "may have", "include", "may include", or the like, indicates existence of a corresponding feature (e.g., a numerical value, a function, an operation, a component such as a part, or the like), and does not exclude existence of an additional feature.

An expression "at least one of A and/or B" is to be understood to represent "A" or "B" or "any one of A and B".

Expressions "first", "second", or the like, used in the disclosure may indicate various components regardless of a sequence and/or importance of the components, will be used only to distinguish one component from the other components, and do not limit the corresponding components.

Singular forms are intended to include plural forms unless the context clearly indicates otherwise. It should be understood that terms "include" or "formed of" used in the disclosure specify the presence of features, numerals, steps, operations, components, parts, or combinations thereof mentioned in the disclosure, but do not preclude the presence or addition of one or more other features, numerals, steps, operations, components, parts, or combinations thereof.

In the disclosure, a term "user" may refer to a person using an electronic device or a device (e.g., an artificial intelligence electronic device) using an electronic device.

Hereinafter, various example embodiments will be described in greater detail with reference to the accompanying drawings.

Figure 1:
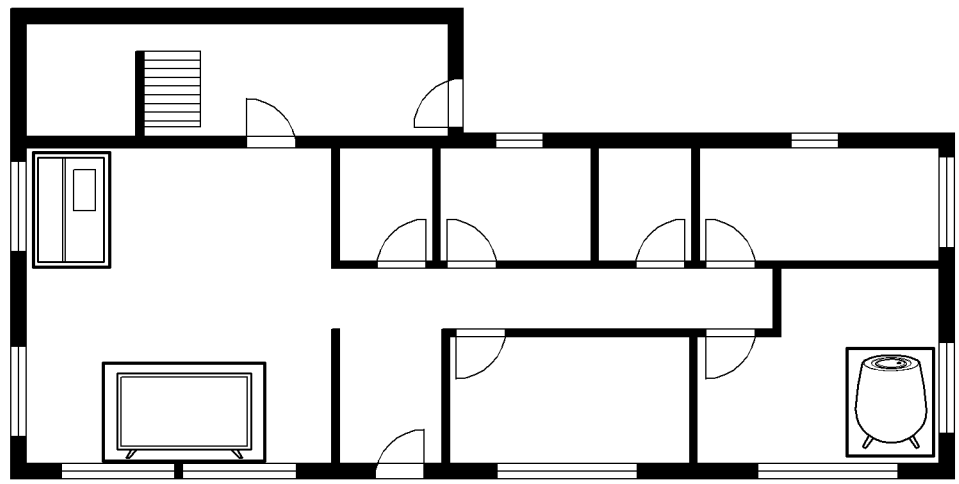
FIG. 1 is a diagram illustrating the related art.
Figure 2A:
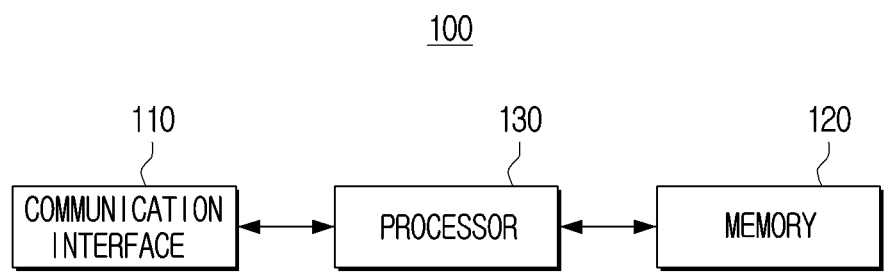
FIG. 2A is a block diagram illustrating an example configuration of an electronic device according to various embodiments.

FIG. 2A is a block diagram illustrating an example configuration of an electronic device according to various embodiments.

The electronic device 100 may be an access point (AP). The access point may be a relay device providing a wireless Internet access function to another electronic device. The electronic device 100 may be a device such as, for example, and without limitation, a smartphone, a tablet personal computer (PC), or a laptop computer, or the like, operating as a software enabled access point (AP). However, the electronic device 100 is not limited thereto, and may be any device as long as it may operate as an access point.

When the number of devices operating as the software enabled access point is plural, a device whose at least one of operation capability or power efficiency is high may be determined as the electronic device 100.

As illustrated in FIG. 2A, the electronic device 100 includes a communication interface (e.g., including communication circuitry) 110, a memory 120, and a processor (e.g., including processing circuitry) 130. However, the electronic device 100 is not limited thereto, and may be implemented in a form in which some components are excluded or may further include other components.

The communication interface 110 is a component performing communication with various types of external devices according to various types of communication manners. For example, the electronic device 100 may perform communication with another electronic device through the communication interface 110. Here, another electronic device may include a device operating as a software enabled access point.

The communication interface 110 may include various communication circuitry including, for example, a wireless fidelity (WiFi) module, a Bluetooth module, an infrared communication module, a wireless communication module, and the like. Here, each communication module may be implemented in the form of at least one hardware chip.

The WiFi module and the Bluetooth module perform communication in a WiFi manner and a Bluetooth manner, respectively. When the WiFi module or the Bluetooth module is used, various connection information such as a service set identifier (SSID), a session key, and the like, is first transmitted and received, communication is connected using the connection information, and various information may then be transmitted and received. The infrared communication module performs communication according to an infrared data association (IrDA) technology of wirelessly transmitting data to a short distance using an infrared ray positioned between a visible ray and a millimeter wave.

The wireless communication module may include at least one communication chip performing communication according to various wireless communication standards such as zigbee, 3rd generation (3G), $3^{rd}$ generation partnership project (3GPP), long term evolution (LTE), LTE advanced (LTE-A), 4th generation (4G), $5^{th}$ generation (5G), and the like, in addition to the communication manner described above.

In addition, the communication interface may include at least one of a local area network (LAN) module, an Ethernet module, or wired communication modules performing communication using a pair cable, a coaxial cable, an optical fiber cable, or the like.

The memory 120 may refer, for example, to hardware storing information such as data in an electric or magnetic form so that the processor 130 may access the memory 120. To this end, the memory 120 may be implemented as at least one hardware of a non-volatile memory, a volatile memory, a flash memory, a hard disk drive (HDD), a solid state drive (SDD), a random access memory (RAM), or a read only memory (ROM).

At least one instruction or module required for an operation of the electronic device 100 or the processor 130 may be stored in the memory 120. Here, the instruction may include a code unit for instructing the operation of the electronic device 100 or the processor 130, and may be written in a machine language, which is a language that a computer may understand. The module may be an instruction set that performs a specific task in work units.

In addition, information for correcting a signal received from each of at least one other electronic device may be stored in the memory 120. For example, the memory 120 may store information for correcting at least one of a received signal strength indication (RSSI), channel state information (CSI), an amplitude, a phase, or a period of a signal received from another electronic device.

In addition, the memory 120 may store information on a reference signal for generating correction information. For example, the memory 120 may store information on at least one of an amplitude, a phase, or a period of a carrier signal.

At least one artificial intelligence model trained to identify information on a user may be stored in the memory 120. Here, the artificial intelligence model may include a plurality of neural network layers, each of which includes a plurality of weight values and performs a neural network operation through an operation between an operation result of the previous layer and the plurality of weights. Examples of the artificial neural network include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-Networks, or the like, and various neural networks as well as the neural networks described above may be used in the disclosure. In addition, the artificial intelligence model may also be configured in an ontology-based data structure in which various concepts, conditions, relationships, or agreed knowledge are expressed in a form that may be processed by a computer.

The artificial intelligence model may be trained through the electronic device 100 or a separate server/system through various training algorithms. The training algorithm may refer, for example, to a method of training a predetermined target device (e.g., a robot) using a plurality of training data to allow the predetermined target device to make a decision or make a prediction by itself. Examples of the training algorithm include, for example, supervised training, unsupervised training, semi-supervised training, or reinforcement training, and various training algorithms may also be used.

The memory 120 may be accessed by the processor 130, and reading, recording, correction, deletion, update, and the like, of the instruction, the module, the artificial intelligence model, or the data in the memory 120 may be performed by the processor 130.

The processor 130 may include various processing circuitry and generally controls an operation of the electronic device 100. For example, the processor 130 may be connected to each component of the electronic device 100 to generally control an operation of the electronic device 100. For example, the processor 130 may be connected to a component such as a display (not illustrated) to control the operation of the electronic device 100.

According to an embodiment, the processor 130 may be implemented by, for example, and without limitation, a digital signal processor (DSP), a microprocessor, a time controller (TCON), or the like. However, the processor 120 is not limited thereto, but may include one or more of a central processing unit (CPU), a micro controller unit (MCU), a micro processing unit (MPU), a controller, an application processor (AP), a communication processor (CP), an ARM processor, a dedicated processor, or the like, or may be defined by these terms. In addition, the processor 130 may be implemented as a system-on-chip (SoC) or a large scale integration (LSI) in which a processing algorithm is embedded or may be implemented in a field programmable gate array (FPGA) form.

The processor 130 may control the communication interface 110 to perform communication with another electronic device operating as a software enabled access point, identify another electronic device that has transmitted a signal among a plurality of other electronic devices based on the signal when the signal is received from another electronic device through the communication interface 110, and correct the received signal based on correction information corresponding to another electronic device among information stored in the memory 120.

Such an operation of the processor 130 will be described in greater detail with reference to various modules of FIG. 2B.

Figure 2B:
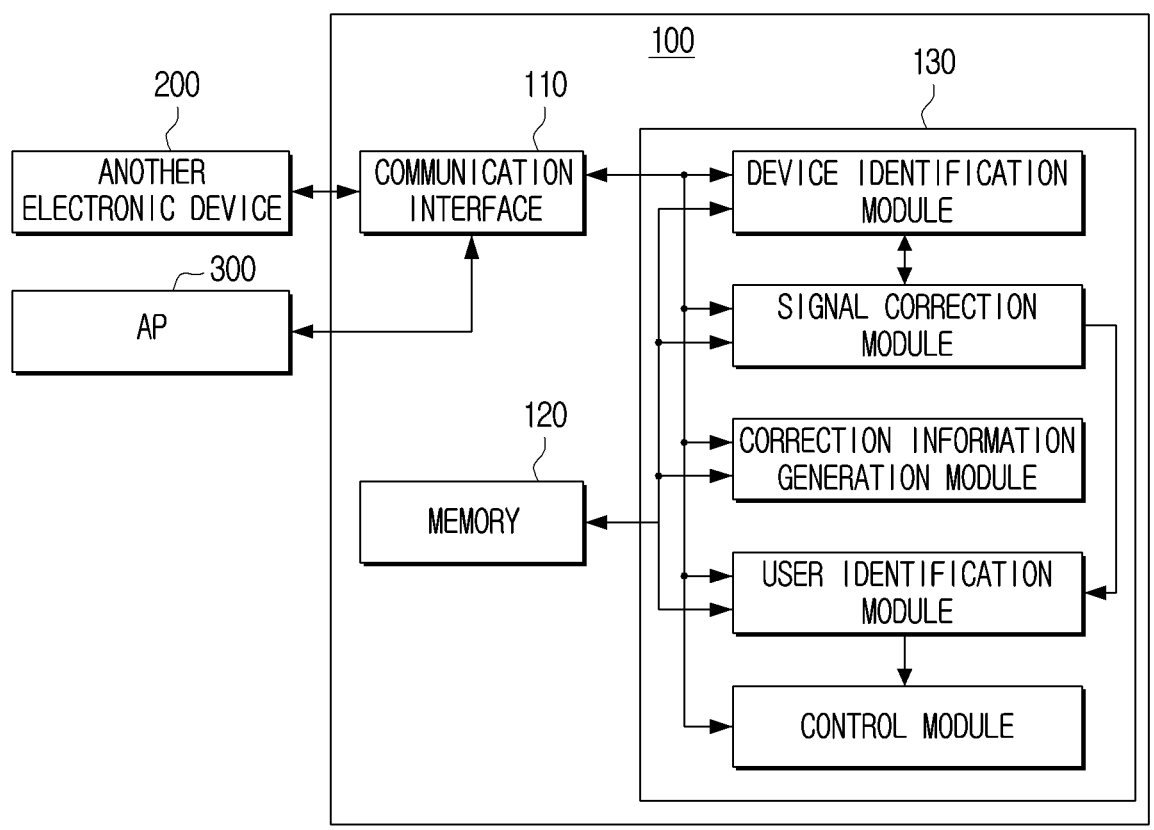
FIG. 2B is a block diagram illustrating an example configuration of the electronic device according to various embodiments.

FIG. 2B is a block diagram illustrating an example configuration of the electronic device according to various embodiments.

FIG. 2B is a block diagram illustrating an example software configuration of the electronic device 100 according to various embodiments. A plurality of modules may be positioned inside the processor 130 in FIG. 2B to indicate a state in which the plurality of modules are loaded (or executed) by the processor 130 and operated in the processor 130, and the plurality of modules may be in a state in which they are stored in the memory 120. It will be understood that the modules may each include various processing circuitry and/or executable program elements.

The processor 130 may control a general operation of the electronic device 100 by executing the module or the instruction stored in the memory 120. For example, the processor 130 may read and interpret the module or the instruction, determine a sequence for data processing, and control an operation of another component such as the memory 120 by transmitting a control signal for controlling the operation of another component accordingly.

When the signal is received from another electronic device 200 operating as the software enabled access point, the processor 130 may read identification information of another electronic device 200 from the received signal by executing a device identification module, and identify another electronic device 200 based on the read information. For example, when the signal is received from another electronic device 200 operating as the software enabled access point, the processor 130 may identify a media access control address (Mac address) included in the received signal, and identify another electronic device 200 corresponding to the identified Mac address based on information on a plurality of other electronic devices stored in the memory 130. In this case, the plurality of other electronic devices and a plurality of Mac addresses each corresponding to the plurality of other electronic devices may be stored in a mapped state in the memory 120.

The processor 130 may correct the received signal based on correction information corresponding to another electronic device 200 among the information stored in the memory 120 by executing a signal correction module. For example, the processor 130 may correct at least one of an amplitude, a phase, or a period of the received signal based on the correction information. For example, when a signal is received from a television (TV) operating as the software enabled access point, the processor 130 may increase an amplitude by 0.1 mV based on first correction information corresponding to the TV, and when a signal is received from a refrigerator operating as the software enabled access point, the processor 130 may delay a phase by 0.2 ms based on second correction information corresponding to the refrigerator.

Such correction information may be obtained based on information on a reference signal stored in the memory 120. When a first signal is received from another electronic device 200 through connection of initial communication with another electronic device 200, the processor 130 may compare the first signal with the reference signal through execution of a correction information generation module to obtain correction information for correcting the signal received from another electronic device 200, and store the obtained correction information in the memory 120. Here, the first signal may be a signal according to a communication protocol or a signal transmitted by another electronic device 200 according to a request of the processor 130.

The processor 130 may receive the reference signal from an access point 300 and store the received reference signal in the memory 120. Here, the access point 300 may be a device separate from the electronic device 100, and the reference signal and the first signal may have the same original data.

When the access point 300 transmits a signal having the same original data and when another electronic device 200 operating as the software enabled access point transmits a signal having the same original data, waveforms of the two signals may be different from each other. This is because the access point 300 and another electronic device 200 are not completely the same as each other and a fine difference thus occurs in a generation process, a modulation process and the like of a carrier signal.

The processor 130 may obtain digital information from the signals received from the access point 300 and another electronic device 200, and when the original data are the same as each other, the digital information obtained from the two signals may also be the same as each other. On the other hand, when the processor 130 identifies whether a user to be described later exists, the processor 130 may use a waveform of the received signal itself rather than the digital information of the received signal, and may not obtain a uniform result when the waveform for each device is different. That is, the processor 130 may perform correction for each device to obtain a uniform result regardless of a device from which the signal is received.

For example, even though the original data are the same as each other, a waveform of the signal received from the access point 300 may have an amplitude greater than that of a waveform of the signal received from the TV by 0.1 mV. In this case, the processor 130 may generate correction information of the TV through the correction information generation module and store the correction information of the TV in the memory 120. Thereafter, when the signal is received from the TV, the processor 130 may identify that the amplitude of the received signal is greater than 0.1 mV based on the correction information of the TV.

It has been described hereinabove that the signal received from the access point 300 is the reference signal for convenience of explanation, but the disclosure is not limited thereto. For example, the processor 130 may identify a signal received from one of the plurality of other electronic devices rather than the access point 300 as the reference signal. For example, the processor 130 may identify a signal having the largest amplitude among a plurality of signals received from the plurality of other electronic devices rather than the access point 300 as the reference signal.

The processor 130 may identify whether the user exists using the corrected signal. For example, the processor 130 may identify at least one of whether the user exists or a position of the user by inputting the corrected signal to an artificial intelligence model through execution of a user identification module. Here, the artificial intelligence model may be a model trained to identify information on the user.

For example, the processor 130 may identify at least one of whether the user exists or the position of the user by inputting a plurality of overlapping sections in the corrected signal to the artificial intelligence model. For example, the processor 130 may identify at least one of whether the user exists or the position of the user by identifying a signal for 10 ms of the corrected signal as one frame and inputting ten frames to the artificial intelligence model at an interval of 3 ms. However, the disclosure is not limited thereto, and a method of inputting the received signal to the artificial intelligence model may be various, and may be any method as long as it is the same as a method determined at the time of training the artificial intelligence model.

Here, the artificial intelligence model may be obtained by training information on the position of the user and a waveform of a signal for each position of the user. In addition, the artificial intelligence model may be trained by further considering positions of the electronic device and at least one other electronic device. For example, when the electronic device 100 is disposed in the living room and a washing machine operating as the software enabled access point is blocked by a wall or a door, the artificial intelligence model may be obtained by training a signal received after passing through the wall or the door from the washing machine.

However, the disclosure is not limited thereto, and the processor 130 may identify at least one of whether the user exists and the position of the user from the corrected signal based on a rule. For example, when an amplitude of the corrected signal is a first value or more and a second value or less, the processor 130 may identify that the user exists, and when the amplitude of the corrected signal is less than the first value or exceeds the second value, the processor 130 may identify that the user does not exist.

When the position of the user is spaced apart from a position of another electronic device 200 by a specified distance or more or a first point in time is reached, the processor 130 may control another electronic device 200 to not operate as the software enabled access point by executing a control module.

In addition, when the user moves within the specified distance from another electronic device 200 or a second point in time is reached while another electronic device 200 does not operate as the software enabled access point, the processor 130 may control another electronic device 200 to operate as the software enabled access point by executing the control module.

It has been described hereinabove that the processor 130 generates the correction information through the comparison with the reference signal and corrects at least one of the amplitude, the phase, or the period of the received signal based on the correction information, but the disclosure is not limited thereto.

For example, the processor 130 may obtain the correction information based on information of another electronic device 200 operating as the software enabled access point, and correct at least one of an RSSI or CSI based on the correction information. In this case, at least one of the RSSI or the CSI may be corrected without information on the reference signal.

The correction of the RSSI will be described in greater detail. The electronic device 100 may be in a state in which it stores specification information on another electronic device 200 operating as the software enabled access point. For example, the electronic device 100 may store at least one of information on a type of another electronic device 200 operating as the software enabled access point or information on transmit power (TX power). The transmit power may include hardware specification information, and may actually change depending on an obstacle, a case of the device, and the like.

To generate the correction information, the electronic device 100 and another electronic device 200 are disposed within a predetermined distance. When a signal is received from another electronic device 200, the processor 130 may obtain the transmit power (TX power) based on the following Equation 1.

$$TXpower = RSSI + 10n \times \log D \qquad \text{[Equation 1]}$$

Here, RSSI is a strength of a radio signal measured at a receiving side and is information that may be measured by the electronic device 100, and n is a free space factor, has a value of 2 to 4, and may be generally set to 2 when there is no obstacle between two devices. In addition, D is a distance between the two devices, and may be information already determined according to the disposition state described above.

The processor 130 may store a difference between the transmit power obtained according to Equation 1 and stored transmit power as the correction information. For example, when it is identified that the transmit power is lower than an average as in the refrigerator, the processor 130 may generate correction information for increasing the transmit power, and when it is identified that the transmit power is higher than the average as in the TV, the processor 130 may generate correction information for increasing the transmit power.

In this manner, the electronic device 100 may store the correction information of the transmit power according to a type of each device.

Thereafter, the electronic device 100 and the plurality of other electronic devices 200 may be disposed in the same place as a home. In this case, the electronic device 100 may measure a distance to each of the plurality of other electronic devices 200 according to Equation 2, which is a modified form of Equation 1 as follows.

$$D = 10^{\frac{TXpower - RSSI}{10n}} \qquad \text{[Equation 2]}$$

Here, the processor 130 may use the correction information of the transmit power obtained by the method described above. For example, when it is identified from the received signal that a device that has transmitted the signal is the refrigerator, the processor 130 may increase the stored transmit power corresponding to the refrigerator based on the correction information, and input this information to Equation 2 to obtain a distance to the refrigerator.

Thereafter, the processor 130 may correct the RSSI based on the obtained distance and the correction information of the transmit power. For example, the processor 130 may correct the RSSI by inputting the obtained distance and the correction information of the transmit power to the following Equation 3.

$$RSSI = -10n \times \log D + TXpower \qquad \text{[Equation 3]}$$

It has been described hereinabove that the correction information of the transmit power is obtained, but the processor 130 may further use correction information of a free space factor. In addition, the processor 130 may correct the CSI rather than the RSSI.

As described above, the electronic device 100 may correct the signal received from another electronic device 200 operating as the software enabled access point, and improve accuracy of the identification of whether the user exists and the position of the user based on the corrected signal.

Various embodiments of the disclosure will be described in greater detail with reference to the drawings below.

Figure 3:
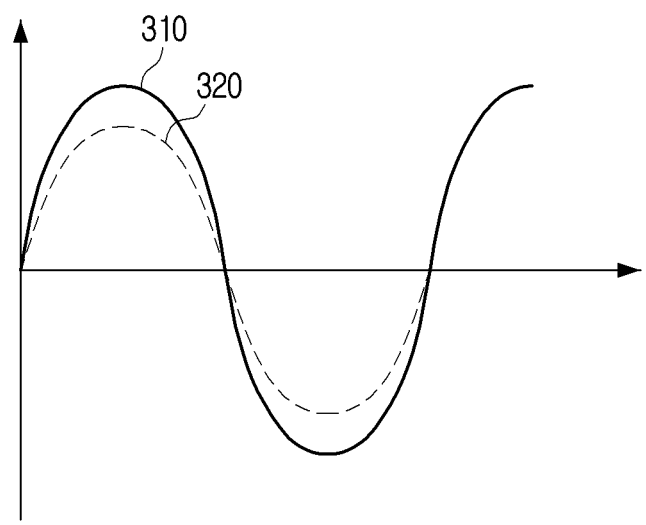
FIG. 3 is a graph illustrating an example signal received from another electronic device operating as a software enabled access point according to various embodiments.

FIG. 3 is a graph illustrating an example signal received from another electronic device 200 operating as a software enabled access point according to various embodiments.

It is assumed, for ease of explanation, that the electronic device 100 is an access point or a device operating as a software enabled access point. In addition, it is assumed that the electronic device 100 operates as an anchor device to process a signal received from another electronic device 200 disposed in the vicinity of the electronic device 100 and operating as a software enabled access point. In addition, it has been illustrated in FIG. 3 that a carrier signal having a trigonometric function form is received for convenience of explanation, but the disclosure is not limited thereto, and the received carrier signal may have various forms.

The processor 130 may receive a signal from another electronic device 200, and this signal may have a waveform different from that of the reference signal. For example, the processor 130 may receive a first signal 310 from the access point 300 and a second signal 320 from another electronic device 200 operating as the software enabled access point. Here, the access point 200 and another electronic device 300 perform communication with the electronic device 100 using the same communication protocol, and carrier signals should thus have the same waveform. That is, the carrier signal of the first signal 310 and the carrier signal of the second signal 320 should have the same waveform, but actually, a fine difference occurs between the carrier signals because there is a hardware difference between the access point 200 and another electronic device 300.

In FIG. 3, for convenience of explanation, examples of the carrier signals have been illustrated and it has been illustrated that only amplitudes of the carrier signals are different from each other. However, the disclosure is not limited thereto, and the carrier signal of the first signal 310 and the carrier signal of the second signal 320 may be further different from each other in at least one of phases or periods as well as in amplitudes.

The processor 130 may store the first signal 310 received from the access point 300 as a reference signal. In addition, the processor 130 may compare the second signal 320 received from the other electronic device 200 with the reference signal to obtain correction information. In a case of FIG. 3, the processor 130 may obtain correction information for improving an amplitude of the second signal 320. In addition, the processor 130 may match identification information and correction information on another electronic device 200 to each other and store the matched information in the memory 120. The identification information on another electronic device 200 may be included as a Mac address in the second signal 320, and the processor 130 may obtain the Mac address from the second signal 320.

By the method as described above, the processor 130 may obtain the correction information on the received signal, and the memory 120 may store correction information on the plurality of other electronic devices.

Thereafter, when a signal is received, the processor 130 may identify a device that has transmitted the signal based on the signal, and correct the received signal based on correction information corresponding to the identified device.

Figure 4A:
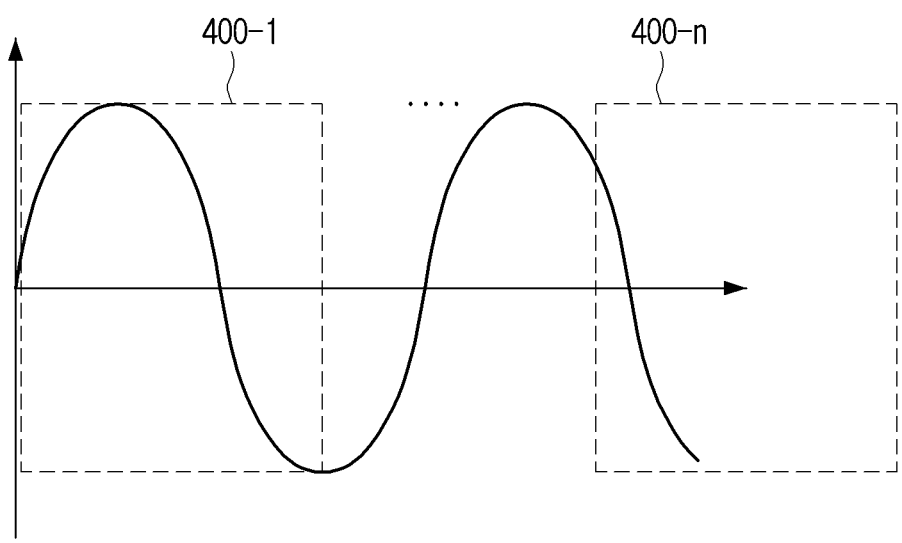
FIGS. 4A and 4B are graphs illustrating an example method of using a corrected signal according to various embodiments.
Figure 4B:
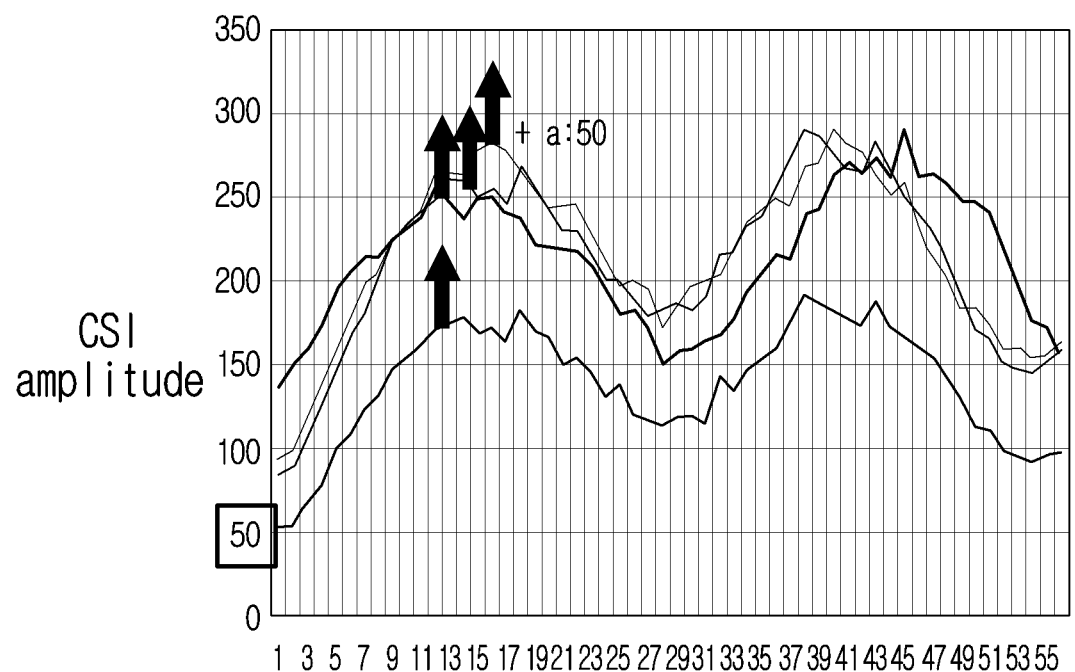
Figure 4B:
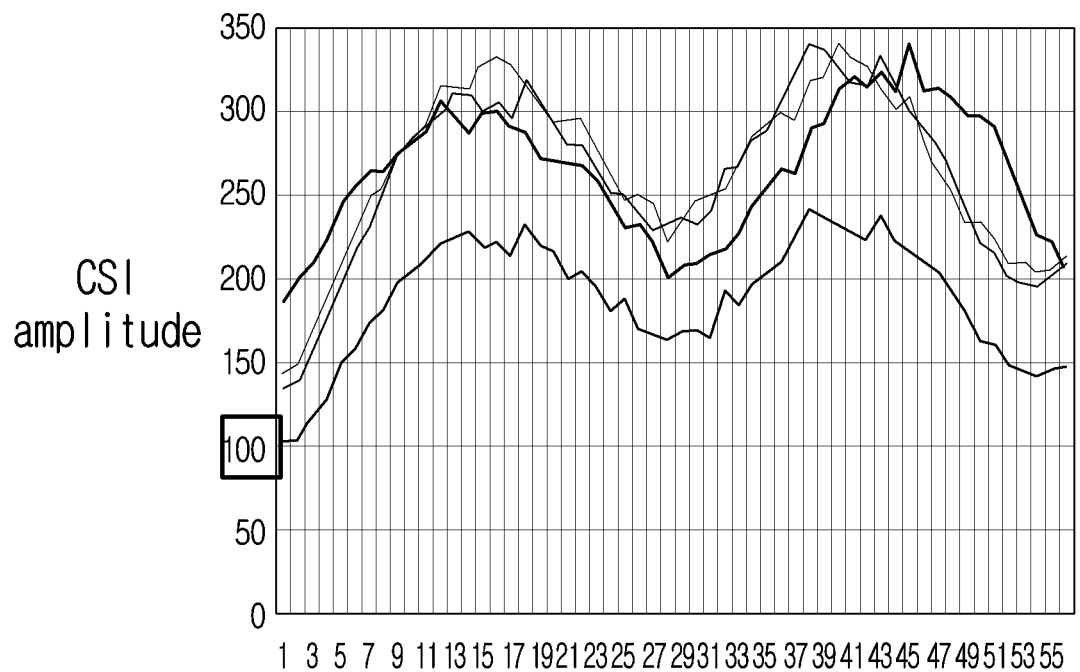

FIGS. 4A and 4B are graphs illustrating an example method of using a corrected signal according to various embodiments.

A corrected signal having a trigonometric function form has been illustrated in FIG. 4A for convenience of explanation, but the disclosure is not limited thereto, and the corrected signal may have various forms.

As described above with reference to FIG. 3, the processor 130 may correct the received signal based on the correction information corresponding to the identified device. The processor 130 may input a plurality of overlapping sections in the corrected signal to the artificial intelligence model. For example, the processor 130 may input a first frame 400-1 indicating a first time section of the corrected signal to an n-th frame 400-n indicating an n-th time section of the corrected signal to the artificial intelligence model, as illustrated in FIG. 4A. Lengths of time sections of a plurality of frames are all the same as each other, and only phases of the plurality of frames are different from each other.

However, the disclosure is not limited thereto, and the artificial intelligence model may be implemented in various forms. For example, the artificial intelligence model may receive at least one of an amplitude, a phase, or a period of the corrected signal rather than the plurality of frames of the corrected signal.

The processor 130 may identify at least one of whether the user exists or the position of the user by inputting information on the corrected signal to the artificial intelligence model. For example, the processor 130 may identify at least one of whether the user exists or the position of the user by correcting a plurality of signals received from the plurality of other electronic devices, inputting each of the plurality of corrected signals to the artificial intelligence model, and performing weighted sum on the results. The processor 130 may identify at least one of whether the user exists or the position of the user by correcting a plurality of signals received from the plurality of other electronic devices and inputting a signal obtained by performing weighed sum on the plurality of corrected signals to the artificial intelligence model. Accuracy of identified information may be improved using the plurality of signals.

However, the disclosure is not limited thereto, and the artificial intelligence model may be trained in consideration of whether all of the plurality of other electronic devices exist. For example, the artificial intelligence model may train at least one of whether signals are received from five other electronic devices and at least one of whether the user exists or the position of the user according to information on the received signals.

The processor 130 may identify at least one of whether the user exists or the position of the user without using the artificial intelligence model. For example, when an amplitude of the corrected signal is a first value or more and a second value or less, the processor 130 may identify that the user exists, and when the amplitude of the corrected signal is less than the first value or exceeds the second value, the processor 130 may identify that the user does not exist.

The processor 130 may identify whether the user exists without using the artificial intelligence model, and identify the position of the user using the artificial intelligence model only when the user exists. Through such an operation, power consumption of the electronic device 100 may be reduced.

The processor 130 may correct the RSSI as in a method using Equations 1 to 3 described above. The processor 130 may improve an amplitude of a CSI signal by 50 as illustrated in FIG. 4B. A method of correcting the CSI signal is similar to the method of correcting the RSSI, and an overlapping description thereof may not be repeated here.

Figure 5:
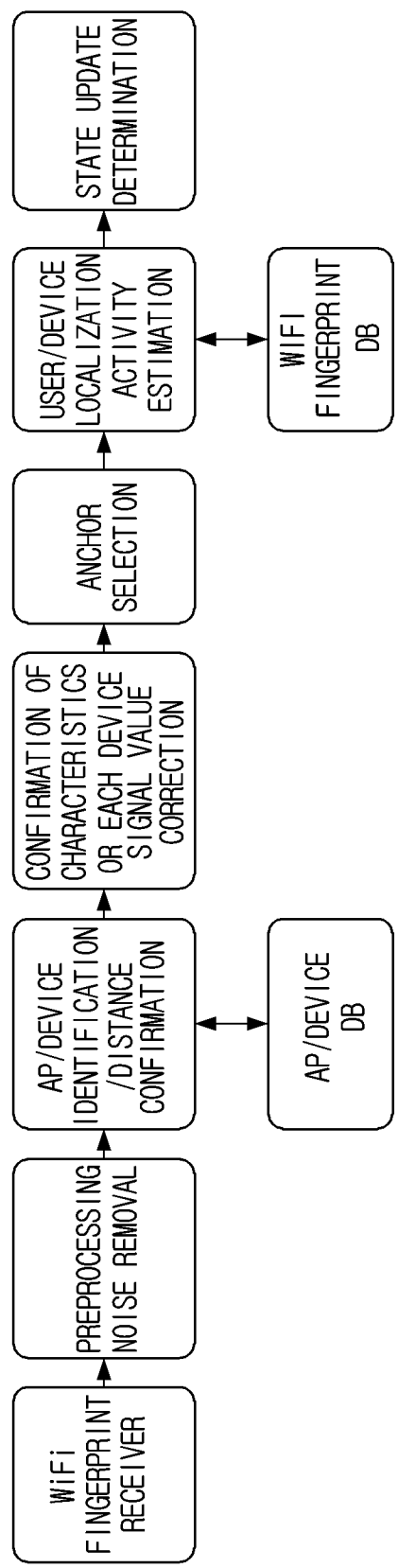
FIG. 5 is a diagram illustrating an example operation of an electronic system according to various embodiments.

FIG. 5 is a diagram illustrating an example operation of an electronic system according to various embodiments. It has been assumed in FIG. 5 that the electronic system includes a server and a plurality of other electronic devices.

The server may perform wireless fidelity (WiFi) communication with the plurality of other electronic devices, and may receive signals from the plurality of other electronic devices as WiFi fingerprints. The server may perform pre-processing such as noise removal on the received signals, identify the plurality of other electronic devices and positions of each of the plurality of other electronic devices, and obtain a database based on the identified information.

In addition, the server may identify another electronic device serving as a reference among the plurality of other electronic devices, and may obtain correction information on signals of the other electronic devices based on a signal of another electronic device serving as the reference.

The server may select one of the plurality of other electronic devices as an anchor device based on at least one of operation capability or power efficiency. For example, the server may select an access point of the plurality of other electronic devices as an anchor device.

When a signal is received from at least one other electronic device, the anchor device may identify at least one of whether the user exists or the position of the user by comparing the received signal with the database constructed in the server, and update a state of the electronic system based on the identified information. Alternatively, the anchor device may identify a position of another electronic device, in addition to an operation of identifying the user.

It has been described hereinabove that the server obtains the database, and the anchor device is a subject of the operation thereafter, but the disclosure is not limited thereto. For example, a role of the server may be implemented in the form of a cloud. The electronic device 100 may be determined as the anchor device from the beginning, and may perform operations from an operation of obtaining the database to an operation of identifying the user. Here, the electronic device 100 may be the access point or one of the plurality of other electronic devices operating as the software enabled access point.

When an initial electronic system is configured through the method as described above, construction of the database and correction using the database may be performed.

Figure 6:
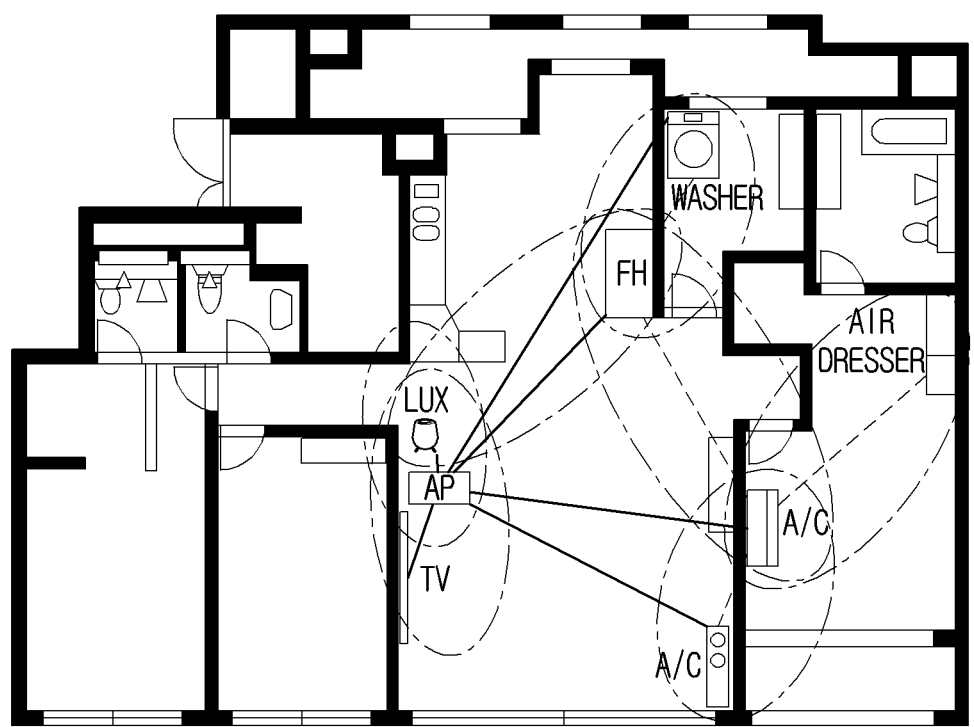
FIG. 6 is a diagram illustrating example correction of a signal according to various embodiments.

FIG. 6 is a diagram illustrating example correction of a signal according to various embodiments.

For convenience of explanation, a general situation is first described. Here, it is assumed that the electronic device 100 is implemented as the access point in FIG. 6.

The processor 130 may receive a signal from an artificial intelligence (AI) speaker Lux and a living room air conditioner A/C. The processor 130 may compare two signals with each other and correct the other of the two signals. For example, the processor 130 may correct a signal received from the living room air conditioner to correspond to a signal received from the AI speaker.

Here, a difference between the two signals is a case where a hardware difference has the greatest influence.

On the other hand, a waveform of the signal may be changed by a wall, a door, a distance, and the like, between the electronic device 100 and another electronic device. In addition, a case of each device may be a factor that changes the waveform of the signal.

For example, the processor 130 may receive signals from a main room air conditioner A/C and an Air dresser. Here, the main home air conditioner is disposed over a wall from the electronic device 100, and the Air dresser is disposed over two walls from the electronic device 100. In this case, the signal received from the Air dresser may have an amplitude smaller than that of the signal received from the main home air conditioner, and may have a phase delayed from that of the signal received from the main home air conditioner.

The processor 130 may correct the signals received from the main room air conditioner and the Air dresser based on information on a reference signal. Here, the reference signal may be a signal received from the AI speaker positioned close to the electronic device 100 and having no obstacle between the AI speaker and the electronic device 100.

However, the disclosure is not limited thereto, and a signal received from another electronic device may be the reference signal.

The memory 120 may store information on the signals received from the main room air conditioner and the Air dresser when there is no obstacle. For example, the memory 120 may store a signal received in a state in which both the main room air conditioner and the Air dresser are disposed in the living room.

In this case, the processor 130 may correct the signals received from the main room air conditioner and the Air dresser based on the signal stored in the memory 120.

Through the method as described above, the processor 130 may perform the correction of the signal by further reflecting the surrounding environment as well as characteristics of another electronic device 200 itself.

Only an obstacle such as the wall has been described hereinabove, but the disclosure is not limited thereto. For example, the processor 130 may correct the received signal by further considering an installation position, a distance from the electronic device 100, an antenna direction, a case material, and the like.

FIG. 7 is a flowchart illustrating an example method of controlling an electronic device according to various embodiments.

Communication with another electronic device operating as the software enabled access point is performed (S710). When a signal is received from another electronic device, another electronic device that has transmitted the signal among a plurality of other electronic devices is identified based on the received signal (S720). The received signal is corrected based on correction information corresponding to another electronic device (S730).

In the correcting (S730), at least one of an RSSI, CSI, an amplitude, a phase, or a period of the received signal may be corrected based on the correction information.

The method may further include receiving a first signal from another electronic device through connection of initial communication with another electronic device, comparing the first signal with the reference signal to obtain correction information for correcting the signal received from another electronic device, and storing the obtained correction information.

The method may further include receiving the reference signal from the access point, and storing the received reference signal, wherein the reference signal and the first signal have the same original data.

The method may further include identifying at least one of whether the user exists or the position of the user by inputting the corrected signal to the artificial intelligence model trained to identify information on the user.

In the identifying of at least one of whether the user exists or the position of the user, at least one of whether the user exists or the position of the user may be identified by inputting a plurality of overlapping sections in the corrected signal to the artificial intelligence model.

The method may further include controlling another electronic device not to operate as the software enabled access point when the position of the user is spaced apart from a position of another electronic device by a predetermined distance or more or a predetermined first point in time is reached.

The method may further include controlling another electronic device to operate as the software enabled access point when the user moves within the predetermined distance from another electronic device or a predetermined second point in time is reached while another electronic device does not operate as the software enabled access point.

The electronic device operates as the software enabled access point, and may be a device whose at least one of operation capability or power efficiency is improved as compared with another electronic device.

In the identifying (S720), another electronic device of the plurality of other electronic devices may be identified based on the Mac address included in the received signal.

According to various embodiments of the disclosure as described above, the electronic device may correct the signal received from another electronic device operating as the software enabled access point to remove a fine difference between signals from the plurality of other electronic devices.

The electronic device may improve accuracy of the identification of whether the user exists and the position of the user based on the signal received from at least one other electronic device operating as the software enabled access point.

According to various embodiments, the embodiments described above may be implemented as software including instructions stored in a machine-readable storage medium (e.g., a computer-readable storage medium). A machine may be a device that invokes the stored instruction from the storage medium and may be operated depending on the invoked instruction, and may include the electronic device (e.g., the electronic device A) according to the disclosed embodiments. When a command is executed by the processor, the processor may directly perform a function corresponding to the command or other components may perform the function corresponding to the command under a control of the processor. The command may include a code generated by a compiler or a code executable by an interpreter. The machine-readable storage medium may be provided in the form of a non-transitory storage medium. The 'non-transitory' storage medium is tangible and may not include a signal, and does not distinguish whether data are semi-permanently or temporarily stored in the storage medium.

In addition, according to various embodiments, the methods described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In a case of the online distribution, at least portions of the computer program product may be at least temporarily stored in a storage medium such as a memory of a server of a manufacturer, a server of an application store, or a relay server or be temporarily created.

In addition, according to various embodiments the method described above may be implemented in a computer or a computer-readable recording medium using software, hardware, or a combination of software and hardware. In some cases, embodiments described in the disclosure may be implemented by a processor itself. According to a software implementation, embodiments such as procedures and functions described in the disclosure may be implemented as separate software modules. Each of the software modules may perform one or more functions and operations described in the disclosure.

Computer instructions for performing processing operations of the machines according to various embodiments of the disclosure described above may be stored in a non-transitory computer-readable medium. The computer instructions stored in the non-transitory computer-readable medium allow a specific machine to perform the processing operations in the machine according to the diverse embodiments described above when they are executed by a processor of the specific machine. The non-transitory computer-readable medium may include a medium that semi-permanently stores data and is readable by the device. Examples of the non-transitory computer-readable medium may include a compact disk (CD), a digital versatile disk (DVD), a hard disk, a Blu-ray disk, a USB, a memory card, a ROM, and the like.

In addition, each of components (e.g., modules or programs) according to the diverse embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

While the disclosure has been illustrated and described with reference to various example embodiments, it will be understood that the various example embodiments are intended to be illustrative, not limiting, and thus the disclosure is not limited to the abovementioned embodiments, but may be variously modified by those skilled in the art to which the disclosure pertains without departing from the true spirit and full scope of the disclosure, including the appended claims and their equivalents.

The invention claimed is:

1. An electronic device comprising:
a communication interface comprising circuitry;
a memory configured to store information for correcting a signal received from each of a plurality of other electronic devices, and to store information on a reference signal; and
at least one processor connected to the memory and the communication interface, and configured to:
control the communication interface to perform communication with another electronic device operating as a software enabled access point,
identify the another electronic device that has transmitted a signal among the plurality of other electronic devices when the signal is received from the another electronic device through the communication interface, and
correct the received signal based on correction information corresponding to the another electronic device among the information stored in the memory,
compare a first signal with the reference signal to obtain the correction information for correcting the signal received from the another electronic device and store the obtained correction information in the memory, when the first signal is received from the another electronic device through connection of initial communication with the another electronic device.

2. The electronic device as claimed in claim 1, wherein the at least one processor is configured to correct least one of a received signal strength indication (RSSI), channel state information (CSI), an amplitude, a phase, or a period of the received signal based on the correction information.

3. The electronic device as claimed in claim 1, wherein the at least one processor is configured to receive the reference signal from an access point and store the received reference signal in the memory, and the reference signal and the first signal have the same original data.

4. The electronic device as claimed in claim 1, wherein the memory is configured to store an artificial intelligence model trained to identify information on a user, and the at least one processor is configured to identify at least one of whether or not the user exists or a position of the user by inputting the corrected signal into the artificial intelligence model.

5. The electronic device as claimed in claim 4, wherein the at least one processor is configured to identify at least one of whether or not the user exists or the position of the user by inputting a plurality of overlapping sections in the corrected signal to the artificial intelligence model.

6. The electronic device as claimed in claim 4, wherein the at least one processor is configured to control the another electronic device not to operate as the software enabled access point when the position of the user is spaced apart from a position of the another electronic device by a predetermined distance or more or a predetermined first point in time is reached.

7. The electronic device as claimed in claim 6, wherein the at least one processor is configured to control the another electronic device to operate as the software enabled access point when the user moves within the predetermined distance from the another electronic device or a predetermined second point in time is reached while the another electronic device does not operate as the software enabled access point.

8. The electronic device as claimed in claim 1, wherein the electronic device operates as the software enabled access point, and is a device whose at least one of operation capability or power efficiency is improved as compared with the another electronic device.

9. The electronic device as claimed in claim 1, wherein the at least one processor is configured to identify the another electronic device of the plurality of other electronic devices based on a media access control address (Mac address) included in the received signal.

10. A control method of an electronic device, comprising:
performing communication with another electronic device operating as a software enabled access point;
identifying the another electronic device that has transmitted a signal among a plurality of other electronic devices when the signal is received from the another electronic device; and
correcting the received signal based on correction information corresponding to the another electronic device,
the control method further comprising:
receiving a first signal from the another electronic device through connection of initial communication with the another electronic device;
comparing the first signal with a reference signal to obtain the correction information for correcting the signal received from the another electronic device; and
storing the obtained correction information.

11. The control method as claimed in claim 10, wherein in the correcting, at least one of an RSSI, CSI, an amplitude, a phase, or a period of the received signal is corrected based on the correction information.

12. The control method as claimed in claim 10, further comprising:
receiving the reference signal from an access point; and
storing the received reference signal,
wherein the reference signal and the first signal have the same original data.

13. The control method as claimed in claim 10, further comprising identifying at least one of whether or not a user exists or a position of the user by inputting the corrected signal to an artificial intelligence model trained to identify information on the user.

* * * * *